United States Patent
Tomita et al.

(10) Patent No.: US 10,626,767 B2
(45) Date of Patent: Apr. 21, 2020

(54) EXHAUST PURIFICATION APPARATUS

(71) Applicant: HINO MOTORS, LTD., Hino-shi (JP)

(72) Inventors: Noriyuki Tomita, Hino (JP); Hirofumi Tongu, Hino (JP); Tomoyuki Tsuruta, Hino (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 16/491,693

(22) PCT Filed: Mar. 9, 2018

(86) PCT No.: PCT/JP2018/009157
§ 371 (c)(1),
(2) Date: Sep. 6, 2019

(87) PCT Pub. No.: WO2018/164257
PCT Pub. Date: Sep. 13, 2018

(65) Prior Publication Data
US 2020/0072110 A1    Mar. 5, 2020

(30) Foreign Application Priority Data

Mar. 9, 2017  (JP) ................................. 2017-044490

(51) Int. Cl.
*F01N 3/20*    (2006.01)
*F01N 3/08*    (2006.01)
(Continued)

(52) U.S. Cl.
CPC ....... *F01N 3/2066* (2013.01); *B01D 46/0027* (2013.01); *B01D 53/9431* (2013.01);
(Continued)

(58) Field of Classification Search
CPC ...... F01N 3/2066; F01N 3/0821; F01N 13/08; F01N 2610/02; F01N 2610/1453
(Continued)

(56) References Cited

U.S. PATENT DOCUMENTS 8,250,859 B2 *  8/2012  Torisaka ............... F01N 13/009
60/295
9,217,348 B2 * 12/2015  Kimura ............... B01F 3/04049
(Continued)

FOREIGN PATENT DOCUMENTS

JP   2013-36332 A    2/2013
JP   2013-142368 A   7/2013
(Continued)

OTHER PUBLICATIONS

International Search Report dated May 15, 2018 in PCT/JP2018/009157 filed on Mar. 9, 2018.

*Primary Examiner* — Tom P Duong
(74) *Attorney, Agent, or Firm* — Oblon, McClelland, Maier & Neustadt, L.L.P.

(57) ABSTRACT

An upstream portion of a communication passage 16 in an exhaust emission control device has a gas gathering chamber 16A encircling and gathering exhaust gas 1 from an exit end of a particulate filter 3 through perpendicular turnabout of the gas 1 and a communication pipe 16B extracting the gas 1 gathered by the chamber 16A through an exhaust outlet 17 into an entry side of a selective reduction catalyst 4. An injector 18 is in the passage 16 to add urea water into the gas flow. The injector 18 is fixed to the chamber 16A in a position opposed to the outlet 17 and in a direction perpendicular to an axis of the filter 3. The outlet 17 of the chamber 16A has a reactor 19 into which the reducing agent injected by the injector 18 is impinged to facilitate gasification of the gas 1.

2 Claims, 4 Drawing Sheets

(51) Int. Cl.
  *F01N 13/08* (2010.01)
  *B01D 53/94* (2006.01)
  *B01D 46/00* (2006.01)
(52) U.S. Cl.
  CPC ........... *F01N 3/0821* (2013.01); *F01N 13/08* (2013.01); *B01D 2279/30* (2013.01); *F01N 2610/02* (2013.01); *F01N 2610/1453* (2013.01)
(58) Field of Classification Search
  USPC ........................................................ 422/169
  See application file for complete search history.

(56) References Cited

U.S. PATENT DOCUMENTS

| | | | | |
|---|---|---|---|---|
| 2010/0132348 A1* | 6/2010 | Kowada | ............. | B01D 53/9431 60/324 |
| 2010/0205945 A1* | 8/2010 | Kowada | ................ | F01N 3/035 60/297 |
| 2010/0257849 A1* | 10/2010 | Kowada | ................ | B01F 5/0473 60/297 |
| 2011/0088376 A1* | 4/2011 | Kowada | ............. | B01F 3/04049 60/297 |
| 2011/0214416 A1* | 9/2011 | Kowada | ................... | F01N 3/035 60/301 |
| 2012/0255287 A1* | 10/2012 | Kowada | ............. | B01D 53/9431 60/295 |
| 2014/0325961 A1* | 11/2014 | Yokota | ................... | F01N 3/208 60/274 |
| 2015/0020484 A1 | 1/2015 | Kimura | | |

FOREIGN PATENT DOCUMENTS

| | | |
|---|---|---|
| JP | 2015-48715 A | 3/2015 |
| JP | 2015-124641 A | 7/2015 |
| JP | 2017-36682 A | 2/2017 |
| WO | WO 2013/017943 A1 | 2/2013 |

\* cited by examiner

EXHAUST PURIFICATION APPARATUS

TECHNICAL FIELD

The present invention relates to an exhaust emission control device.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as a reducing agent being added in a position between the selective reduction catalyst and the particulate filter, thereby attaining lessening of both the particulates and $NO_x$.

Such addition of the urea water to the selective reduction catalyst is conducted in the position between the particulate filter and the selective reduction catalyst. Thus, in order to ensure sufficient reaction time for pyrolysis of the urea water added to the exhaust gas into ammonia and carbon dioxide gas, it is necessary to prolong a distance between the urea-water added position and the selective reduction catalyst. However, arrangement of the particulate filter and the selective reduction catalyst in a substantially spaced apart relationship will extremely impair the mountability thereof on a vehicle.

In order to overcome this, an exhaust emission control device compact in size as shown in FIG. 1 has been proposed by the applicant same as that of the present invention (see below-mentioned Patent Literature 1). In the exhaust emission control device illustrated, incorporated in an exhaust pipe 2 through which exhaust gas 1 from an engine flows is a particulate filter 3 housed in a casing 5 to capture particles in the exhaust gas 1; arranged downstream of and in parallel with the particulate filter 3 and housed in a casing 6 is a selective reduction catalyst 4 having a property capable of selectively reacting $NO_x$ with ammonia even in the presence of oxygen. An exit side of the particulate filter 3 is connected to an entry side of the selective reduction catalyst 4 through an S-shaped communication passage 7 such that the exhaust gas 1 discharged from the exit side of the particulate filter 3 is oppositely turned into the entry side of the adjacent selective reduction catalyst 4.

The communication passage 7 is the S-shaped structure comprising a gas gathering chamber 7A which encircles an exit end of the particulate filter 3 to gather the exhaust gas 1 just discharged therefrom through substantially perpendicular turnabout of the gas, a communication pipe 7B which extracts the gathered exhaust gas 1 from the chamber 7A oppositely to the flow of the exhaust in the particulate filter 3 and a gas dispersing chamber 7C which encircles the entry side of the selective reduction catalyst 4 to disperse the exhaust gas 1 guided by the communication pipe 7B through substantially perpendicular turnabout of the gas into the entry side of the selective reduction catalyst 4. An entry end of the communication pipe 7B is centrally provided with an injector 8 for addition of the urea water into the communication pipe 7B and directed toward the exit side thereof.

In the example illustrated, arranged in the casing 5 and in front of the particulate filter 3 is an oxidation catalyst 9 for oxidization treatment of unburned components in the exhaust gas 1, and arranged in the casing 6 and behind the selective reduction catalyst 4 is an ammonia lessening catalyst 10 for oxidization treatment of surplus ammonia.

With such construction being employed, particulates in the exhaust gas 1 are captured by the particulate filter 3; downstream thereof and at the entry end of the communication pipe 7B, the urea water is added into the exhaust gas 1 by the injector 8 and is pyrolyzed into ammonia and carbon dioxide gas so that $NO_x$ in the exhaust gas 1 is favorably reduced and depurated by the ammonia on the selective reduction catalyst 4. Thus, both the particulates and $NO_x$ in the exhaust gas 1 are lessened.

In this case, the exhaust gas 1 discharged from the exit side of the particulate filter 3 is oppositely turned by the communication passage 7 into the entry side of the adjacent selective reduction catalyst 4 so that a long distance is ensured between the urea-water added position and the selective reduction catalyst 4 to ensure enough reaction time for production of ammonia from the urea water.

Moreover, the particulate filter 3 is arranged in parallel with the selective reduction catalyst 4, and the communication passage 7 is arranged between and along the particulate filter 3 and selective reduction catalyst 4 so that the whole structure becomes compact in size to substantially enhance mountability thereof on a vehicle.

And, as disclosed in the below-mentioned Patent Literature 1, employed in a position where urea water is added by the injector 8 is a mixer structure 15 such that the exhaust gas 1 from the gas gathering chamber 7A is tangentially introduced into entry-side openings 11 on the cylindrical communication pipe 7B by guide fins 12, 13 and 14 as particularly shown in FIGS. 2 and 3, thereby affording a swirling flow (swirl) to the exhaust gas 1. The urea water is added centrally of the swirling flow by the injector 8.

Specifically, in order to further effectively facilitate transformation of the urea water into ammonia, it is necessary to positively facilitate gasification of the urea water to proceed with substantive chemical reaction for ammonia production. Thus, the swirling flow is afforded to the exhaust gas 1 and the urea water is added from the injector 8 centrally of the swirling flow, whereby the urea water is effectively contacted with an inner periphery of the communication pipe 7B to facilitate gasification of the urea water through heat receiving from the inner periphery of the communication pipe 7B.

CITATION LIST

Patent Literature

Patent Literature 1: JP 2015 048715A

SUMMARY OF INVENTION

Technical Problems

Since the gas gathering chamber 7A has greatest exhaust heat energy in the communication passage 7, addition of the urea water into the gas gathering chamber 7A is expected to be effective. However, in such conventional device, the injector 8 is fixed not to the gas gathering chamber 7A but to an entry end of the communication pipe 7B downstream thereof for fear of possible burnout of the injector exposed to high temperature; thus, it has been regarded that exhaust heat energy is not effectively utilized yet.

Thus, the urea water is in a condition of being added more than needed so as to ensure a requisite amount of ammonia in the downstream selective reduction catalyst 4, which may lead to increase of ungasified remaining urea water in the communication pipe 7B and resultant corrosion or other disadvantages due to the ungasified remaining urea water.

The invention was made in view of the above and has its object to provide an exhaust emission control device which can effectively facilitate gasification of a reducing agent through utilization of exhaust heat energy more effective than ever before.

Solution to Problems

The invention is directed to an exhaust emission control device comprising a particulate filter, a selective reduction catalyst arranged downstream thereof for selectively reacting $NO_x$ with a reducing agent even in the presence of oxygen and a communication passage for introducing exhaust gas from an exit side of the particulate filter to an entry side of the selective reduction catalyst, an upstream portion of said communication passage being constituted by a gas gathering chamber for encircling an exit end of the particulate filter to gather the exhaust gas therefrom through substantially perpendicular turnabout of the gas and a communication pipe for extracting the exhaust gas gathered by said gas gathering chamber through an exhaust outlet into the entry side of said selective reduction catalyst, an injector being incorporated in said communication passage so as to add the reducing agent into the flow of exhaust gas, characterized in that said injector is fixed to said gas gathering chamber in a position opposed to the exhaust outlet and in a direction substantially perpendicular to an axis of said particulate filter, and the exhaust outlet of said gas gathering chamber is provided with a reactor against which the reducing agent injected by said injector is impinged to facilitate gasification thereof.

Then, the exhaust gas discharged from the exit side of the particulate filter flows to the exhaust outlet in a shortest distance through substantially perpendicular turnabout of the gas, which brings about a stagnation area in the gas gathering chamber on a side opposed to the exhaust outlet where the exhaust gas flow stagnates and heat influence by the exhaust gas is not significant and where an injector installed is hardly exposed to high temperature so that the injector can he thermally protected by an existing cooling function. Thus, realized is fixing of the injector to the gas gathering chamber having greatest exhaust heat energy in the communication passage.

Moreover, the reactor is arranged on the exhaust outlet into which the exhaust gas gathered by the gas gathering chamber flows so that the reactor is effectively heated by the heat of the exhaust gas into high temperature. The reducing agent injected by the injector is impinged against the reactor, which can effectively facilitate gasification of the reducing agent.

Further, it is preferable in the invention that the exhaust outlet is opened directed slantly downward in an anglarily deviated manner from a direct downward direction of the gas gathering chamber, and the injector is not arranged in a position directly overhead of the gas gathering chamber but slantly arranged to be opposed to the exhaust outlet. Then, the injector has no need to take an upward posture tending to cause clogging of the injector and has no need to he arranged in the position directly overhead of the gas gathering chamber where temperature locally tends to become high.

Advantageous Effects of Invention

According to the above-mentioned exhaust emission control device of the invention, various excellent effects can be obtained as follows.

(I) The injector and the reactor can be fixed to the gas gathering chamber having greatest exhaust heat energy in the communication passage, so that gasification of the reducing agent can be effectively facilitated through effective utilization of the exhaust heat energy. Thus, an added amount of the reducing agent can be reduced more than ever before and corrosion or other disadvantages due to the ungasified remaining reducing agent can be prevented.

(II) If the exhaust outlet is opened directed slantly downward in an anglarily deviated manner from a direct downward direction of the gas gathering chamber and the injector is not arranged in a position directly overhead of the gas gathering chamber but slantly arranged to be opposed to the exhaust outlet, then the injector has no need to take an upward posture tending to cause clogging of the injector, can be fixed to the gas gathering chamber with a downward or lateral posture and can be arranged not in a position directly overhead of the gas gathering chamber where temperature locally tends to become high, which contribute to keeping soundness of the injector for a long period of time.

DESCRIPTION OF EMBODIMENT

An embodiment of the invention will be described in conjunction with drawings.

Figure 1:
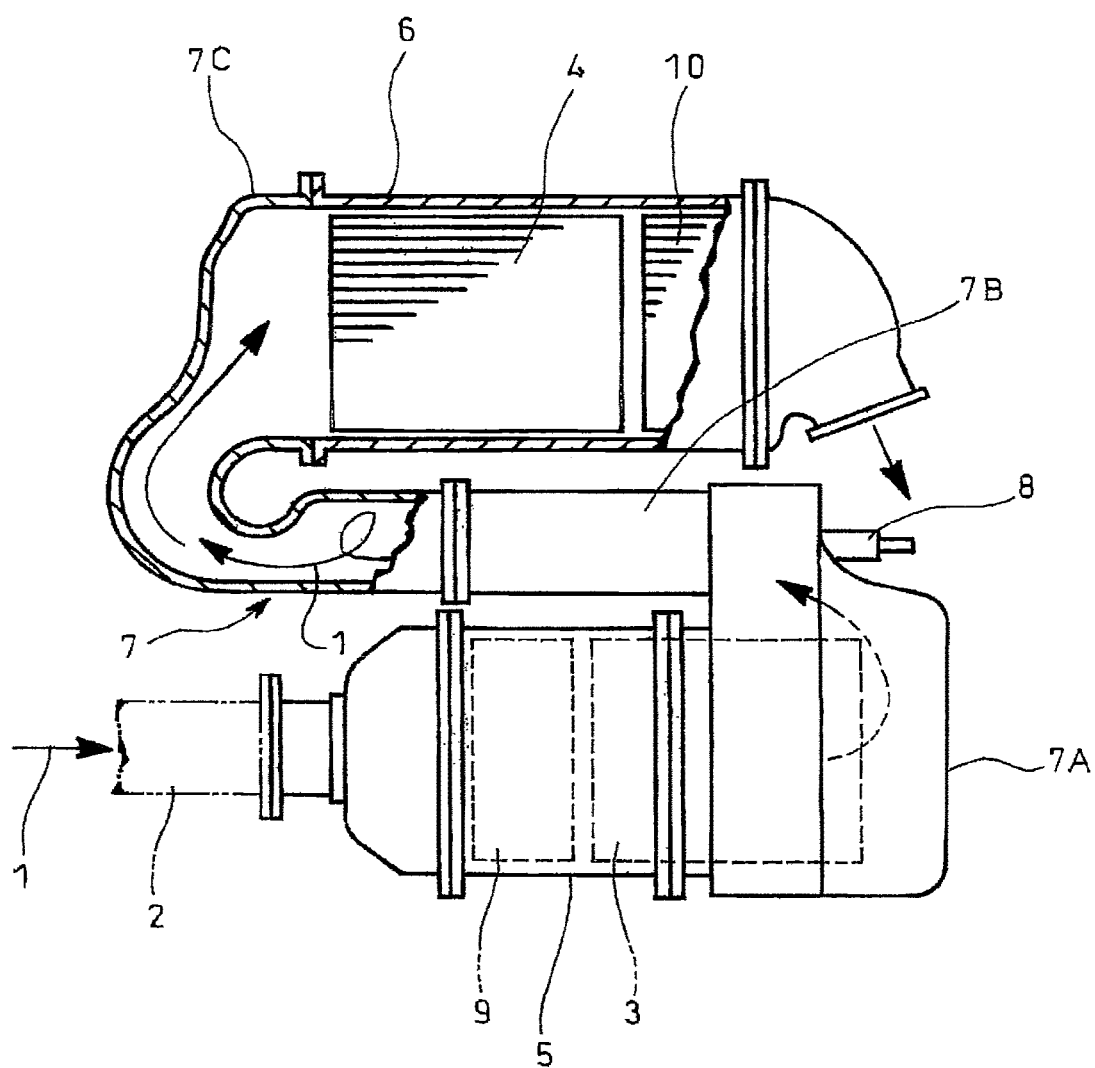
FIG. 1 is a partly cut out schematic diagram showing a conventional example.
Figure 2:
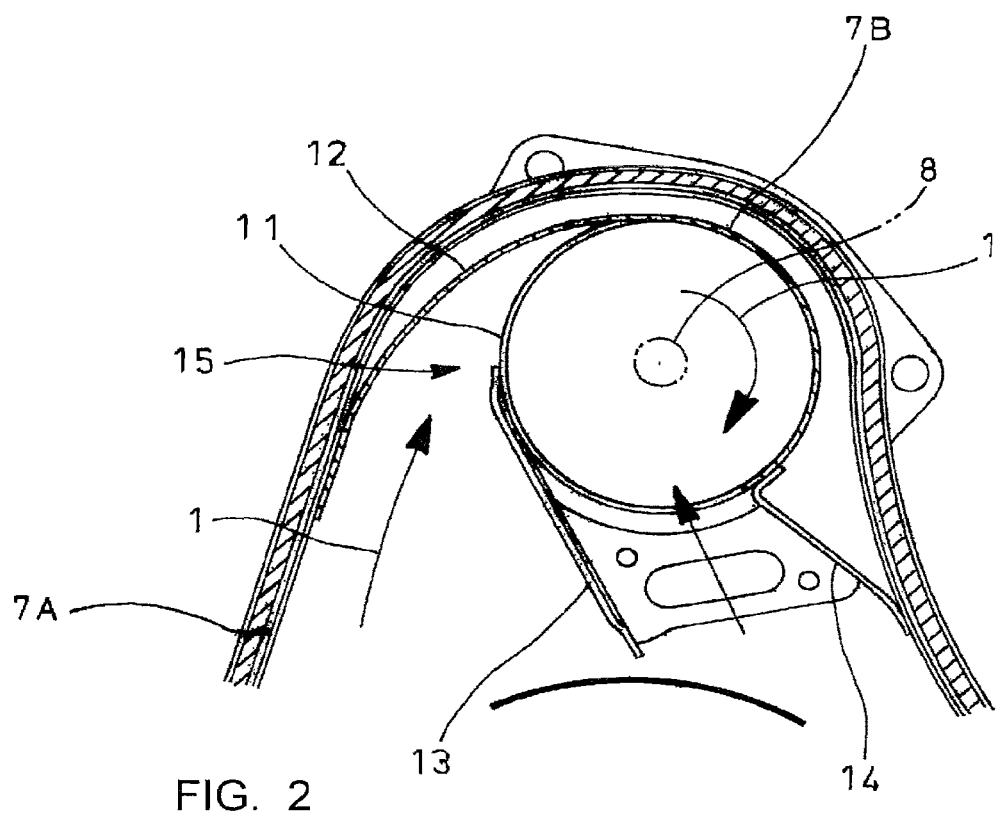
FIG. 2 is a sectional view showing particulars of important parts in FIG. 1.
Figure 3:
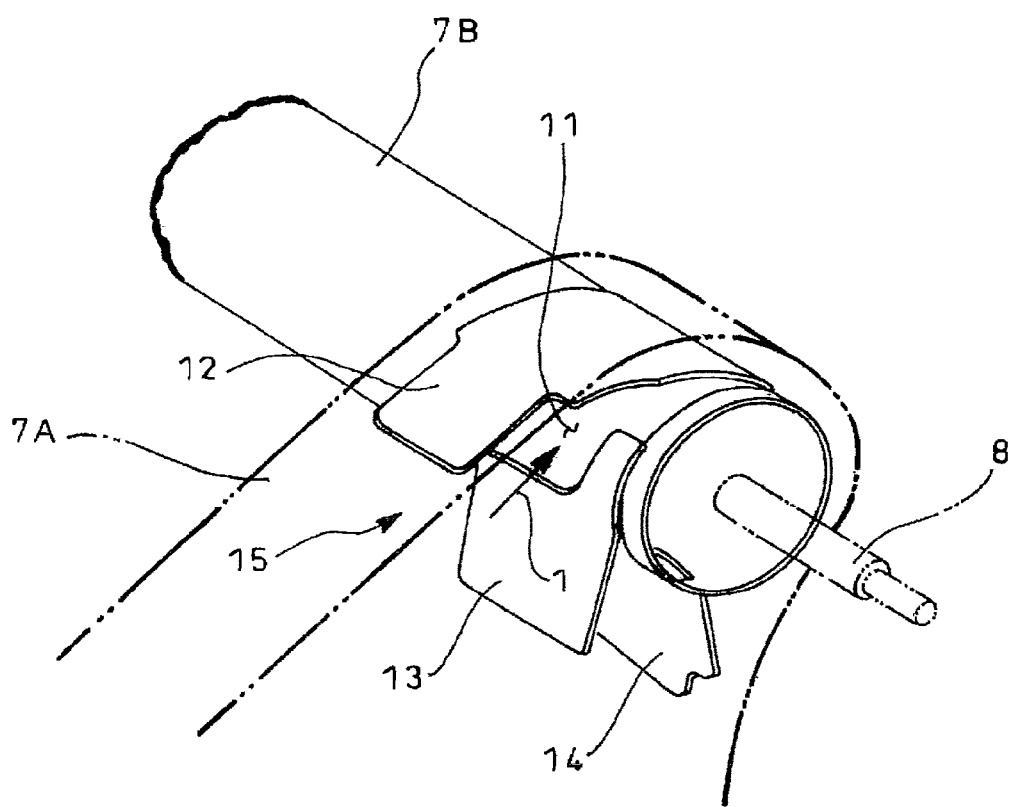
FIG. 3 is a perspective view showing the important parts in FIG. 1 in an enlarged scale.
Figure 4:
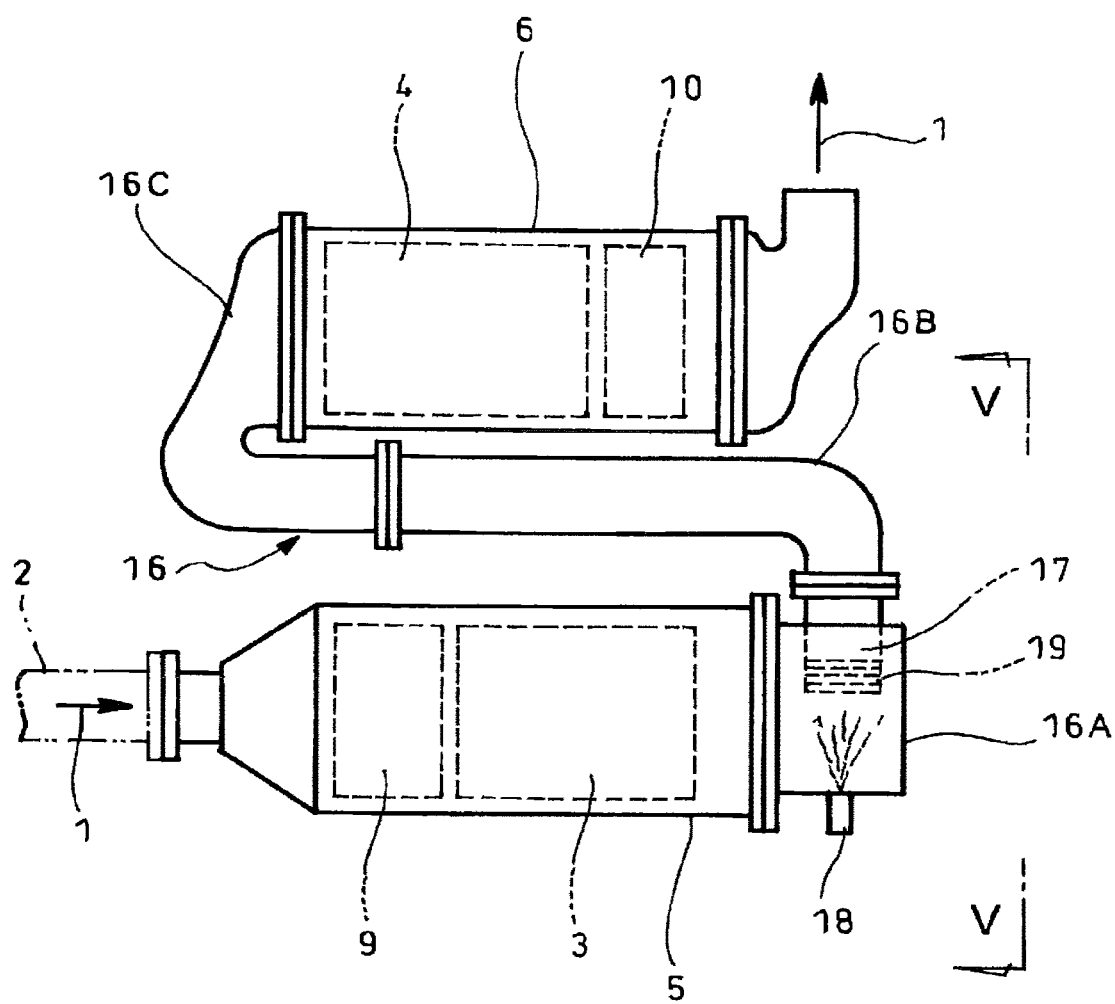
FIG. 4 is a schematic diagram showing an embodiment of the invention.

FIG. 4 shows the embodiment of an exhaust emission control device according to the invention which is substantially similar in construction to that illustrated in the above and shown in FIGS. 1-3. Incorporated in an exhaust pipe 2 through which exhaust gas 1 from an engine flows and arranged and housed respectively in casings 5 and 6 in parallel with each other are a particulate filter 3 to capture particles in the exhaust gas 1 and a selective reduction catalyst 4 downstream thereof and having a property capable of selectively reacting $NO_x$ with ammonia even in the presence of oxygen. A communication passage 16 is provided to oppositely turn the exhaust gas discharged from an exit side of the particulate filter 3 into an entry side of the adjacent selective reduction catalyst 4.

However, the communication passage 16 employs no mixer structure to afford the swirling flow to the exhaust gas 1 as illustrated in the above with respect to FIGS. 2 and 3 and provides an S-shaped structure comprising a gas gathering chamber 16A which encircles an exit end of the particulate filter 3 to gather the exhaust gas 1 discharged therefrom through substantially perpendicular turnabout of the gas, a communication pipe 16B which extracts the exhaust gas 1 gathered in the gas gathering chamber 16A through an exhaust outlet 17 to the entry side of the selective reduction catalyst 4 and a gas dispersing chamber 16C which encircles the entry side of the selective reduction catalyst 4 to disperse the exhaust gas 1 guided by the communication pipe 16B through substantially perpendicular turnabout of the gas into the entry side of the selective reduction catalyst 4.

Figure 5:
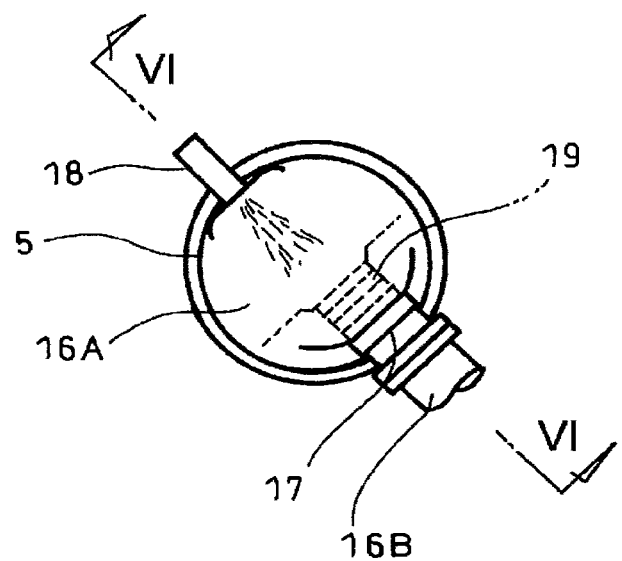
FIG. 5 is a view looking in a direction of arrows V in FIG. 4.

As shown in FIG. 5, the exhaust outlet 17 of the gas gathering chamber 16A is opened directed slantly downward in an anglarily deviated manner from a direct downward direction of the gas gathering chamber 16A toward the selective reduction catalyst 4. An injector 18 is attached to the gas gathering chamber 16A on a slantly upward position opposed to the exhaust outlet 17 such that urea water (reducing agent) may be injected to the exhaust outlet 17. The exhaust outlet 17 of the gas gathering chamber 16A is provided with a reactor 19 against which the urea water injected by the injector 18 is impinged for facilitated gasification thereof.

Figure 6:
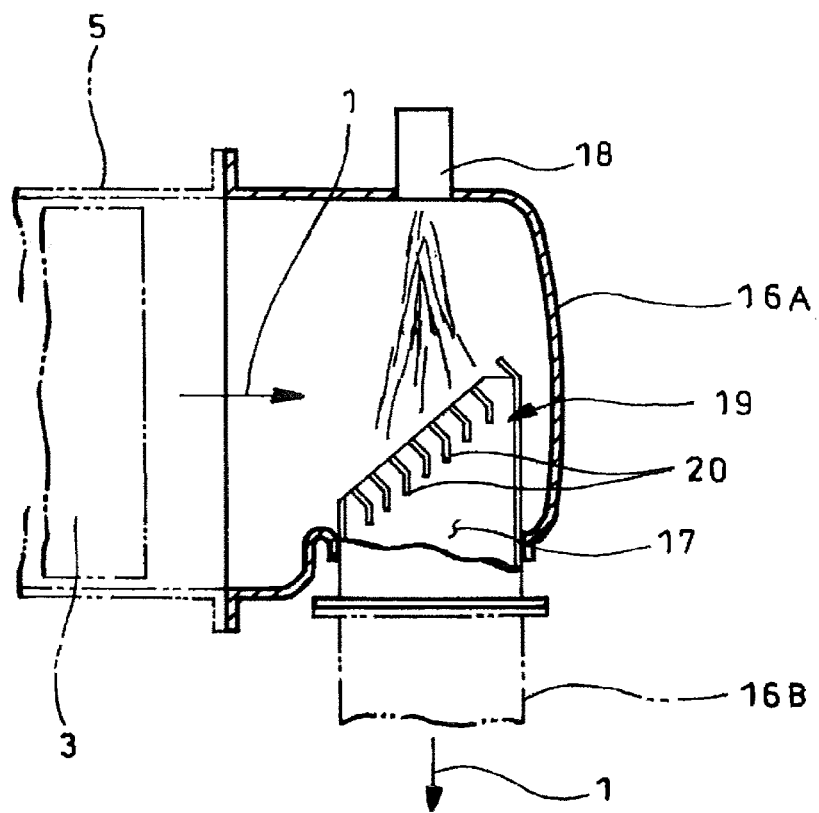
FIG. 6 is a sectional view looking in a direction of arrows VI in FIG. 5.

As shown in FIG. 6, the reactor 19 is an aerated structure with a plurality of rectification plates 20 arranged in a spaced-apart relationship. The respective rectification plates 20 have angled sections to rectify the flow of the exhaust gas 1 discharged from the exit end of the particulate filter 3 through substantially perpendicular turnabout of the gas and are arranged in a slant array in a direction substantially bisecting an angle formed by outflow and inflow directions of the exhaust gas 1.

Also in the embodiment, arranged in the casing 5 and in front of the particulate filter 3 is an oxidation catalyst 9 for oxidization treatment of unburned fuel components in the exhaust gas 1, and arranged in the casing 6 and behind the selective reduction catalyst 4 is an ammonia lessening catalyst 10 for oxidization treatment of surplus ammonia (see FIG. 4).

With the exhaust emission control device thus constructed, the exhaust gas 1 discharged from the exit side of the particulate filter 3 to the exhaust outlet 17 through substantially perpendicular turnabout of the gas tends to flow in the shortest distance, which brings about a stagnation area in the gas gathering chamber 16A on a side opposed to the exhaust outlet 17 where the flow of the exhaust gas 1 stagnates and heat influence by the exhaust gas 1 is not significant.

Thus, the injector 18 arranged on the slantly upward position of the gas gathering chamber 16A opposed to the exhaust outlet 17 becomes hardly exposed to high temperature and is capable of being thermally protected by any existing cooling function, so that realized is fixing of the injector 18 to the gas gathering chamber 16A having exhaust heat energy greatest in the communication passage 16.

Moreover, the reactor 19, which is provided on the exhaust outlet 17 into which the exhaust gas 1 gathered by the gas gathering chamber 16A flows, is effectively heated into high temperature by heat of the exhaust gas 1; the urea water injected by the injector 18 can be impinged against the reactor 19 to effectively facilitate gasification of the urea water.

Thus, according to the above embodiment, the injector 18 and the reactor 19 can be arranged in the gas gathering chamber 16A having greatest exhaust heat energy in the communication passage 16 to effectively utilize the exhaust heat energy to effectively facilitate gasification of the urea water, so that an added amount of urea water can be reduced more than ever before and corrosion or other disadvantages due to the remaining urea water without gasified can be also prevented.

Further, especially in the embodiment, the exhaust outlet 17 is opened directed slantly downward in an anglarily deviated manner from a direct downward direction of the gas gathering chamber 16A, and the injector 18 is not arranged in a position directly overhead of the gas gathering chamber 16A but slantly arranged to be opposed to the exhaust outlet 17, so that the injector 18 has no need to take an upward posture tending to cause clogging of the injector, can be fixed to the gas gathering chamber 16A at a downward or lateral posture and can be arranged not in a position directly overhead of the gas gathering chamber 16A where temperature locally tends to become high, which contribute to keeping soundness of the injector 18 for a long period of time.

It is to be understood that an exhaust emission control device according to the invention is not limited to the above embodiment and that various changes and modifications may be made without departing from the scope of the invention. For example, though the description is made on the embodiment shown in FIGS. 4-6 where the reducing agent is urea water, alternatively the reducing agent may be fuel, provided that the selective reduction catalyst has a property of selectively reacting $NO_x$ with HC gas even in the presence of oxygen.

REFERENCE SIGNS LIST 1 exhaust gas
3 particulate filter
4 selective reduction catalyst
8 injector
16 communication passage
16A gas gathering chamber
16B communication pipe
17 exhaust outlet
18 injector
19 reactor

The invention claimed is:

1. An exhaust emission control device comprising a particulate filter, a selective reduction catalyst arranged downstream thereof for selectively reacting $NO_x$ with a reducing agent even in the presence of oxygen and a communication passage for introducing exhaust gas from an exit side of the particulate filter to an entry side of the selective reduction catalyst, an upstream portion of said communication passage being constituted by a gas gathering chamber for encircling an exit end of the particulate filter to gather the exhaust gas therefrom through substantially perpendicular turnabout of the gas and a communication pipe for extracting the exhaust gas gathered by said gas gathering chamber through an exhaust outlet into the entry side of said selective reduction catalyst, an injector being incorporated in said communication passage so as to add the reducing agent into the flow of exhaust gas, wherein said injector is fixed to said gas gathering chamber in a position opposed to the exhaust outlet and in a direction substantially perpendicular to an axis of said particulate filter, and the exhaust outlet of said gas gathering chamber is provided with a reactor against which the reducing agent injected by said injector is impinged to facilitate gasification thereof.

2. The exhaust emission control device as claimed in claim 1, wherein the exhaust outlet is opened directed slantly downward in an anglarily deviated manner from a direct downward direction of the gas gathering chamber, and the injector is not arranged in a position directly overhead of the gas gathering chamber but slantly arranged to be opposed to the exhaust outlet.

* * * * *